US011824973B2

(12) United States Patent
Bryden

(10) Patent No.: US 11,824,973 B2
(45) Date of Patent: Nov. 21, 2023

(54) SYSTEMS AND METHODS FOR ENHANCED KEY SECURITY IN AN SD-WAN NETWORK ENVIRONMENT

(71) Applicant: Fortinet, Inc., Sunnyvale, CA (US)

(72) Inventor: Simon Bryden, La Roquette sur Siagne (FR)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/671,426

(22) Filed: Feb. 14, 2022

(65) Prior Publication Data

US 2023/0261859 A1 Aug. 17, 2023

(51) Int. Cl.
*H04L 9/08* (2006.01)

(52) U.S. Cl.
CPC .......... *H04L 9/0827* (2013.01); *H04L 9/0852* (2013.01); *H04L 9/0841* (2013.01)

(58) Field of Classification Search
CPC .... H04L 9/0827; H04L 9/0852; H04L 9/0841
See application file for complete search history.

(56) References Cited

U.S. PATENT DOCUMENTS

| | | | | |
|---|---|---|---|---|
| 10,142,298 | B2* | 11/2018 | Mehta | H04L 63/083 |
| 11,349,808 | B2* | 5/2022 | Theogaraj | H04L 63/061 |
| 11,438,240 | B2* | 9/2022 | Yelahanka Raghuprasad | H04L 41/5019 |
| 2019/0036687 | A1* | 1/2019 | Raza | H04L 45/64 |
| 2019/0207844 | A1* | 7/2019 | Kodavanty | H04L 45/02 |
| 2020/0177503 | A1* | 6/2020 | Hooda | H04L 12/66 |
| 2020/0195439 | A1* | 6/2020 | Suresh | H04L 9/3213 |
| 2020/0322230 | A1* | 10/2020 | Natal | H04L 45/42 |
| 2021/0168090 | A1* | 6/2021 | Momchilov | H04L 69/16 |
| 2021/0367872 | A1* | 11/2021 | Huang | H04L 43/10 |
| 2022/0256001 | A1* | 8/2022 | Inamdar | H04L 65/403 |
| 2022/0329540 | A1* | 10/2022 | Tangirala | H04L 47/825 |
| 2022/0329563 | A1* | 10/2022 | Yeh | H04L 12/4641 |
| 2023/0030403 | A1* | 2/2023 | Jeuk | H04L 63/029 |

* cited by examiner

*Primary Examiner* — Viral S Lakhia

(57) ABSTRACT

Systems, devices, and methods are discussed for leveraging SD-WAN's property of redundant independent paths to enable out of band key exchange using the collection of available paths, dynamically managing link failures to keep the separation whenever possible, and/or signaling availability of quantum-safe data transfer to SD-WAN to enable quantum-safety to be used in SD-WAN policy decisions.

20 Claims, 10 Drawing Sheets

SYSTEMS AND METHODS FOR ENHANCED KEY SECURITY IN AN SD-WAN NETWORK ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for secure data transfer, and more particularly to systems and methods systems and methods for leveraging SD-WAN's property of redundant independent paths to enable out of band key exchange using the collection of available paths, dynamically managing link failures to keep the separation whenever possible, and/or signaling availability of quantum-safe data transfer to SD-WAN to enable SD-WAN to be used in policy decisions.

BACKGROUND

As quantum computers start to approach reality, the possibilities of future data insecurity are becoming more and more important. In particular, such quantum computers may render the previously secure Diffie Hellman key exchange protocol insecure. If the Diffie Hellman key exchange protocol is broken, then the resulting keys can be used to decrypt the actual user data. Quantum Key Distribution (QKD) has been proposed for use in place of the Diffie Hellman key exchange protocol, however, it is an expensive solution that may be beyond many customers.

Hence, there exists a need in the art for a cost-effective key exchange solution that would offer security in even quantum computing environments.

SUMMARY

Various embodiments provide systems and methods for leveraging SD-WAN's property of redundant independent paths to enable out of band key exchange using the collection of available paths, dynamically managing link failures to keep the separation whenever possible, and/or signaling availability of quantum-safe data transfer to SD-WAN to enable SD-WAN to be used in policy decisions.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
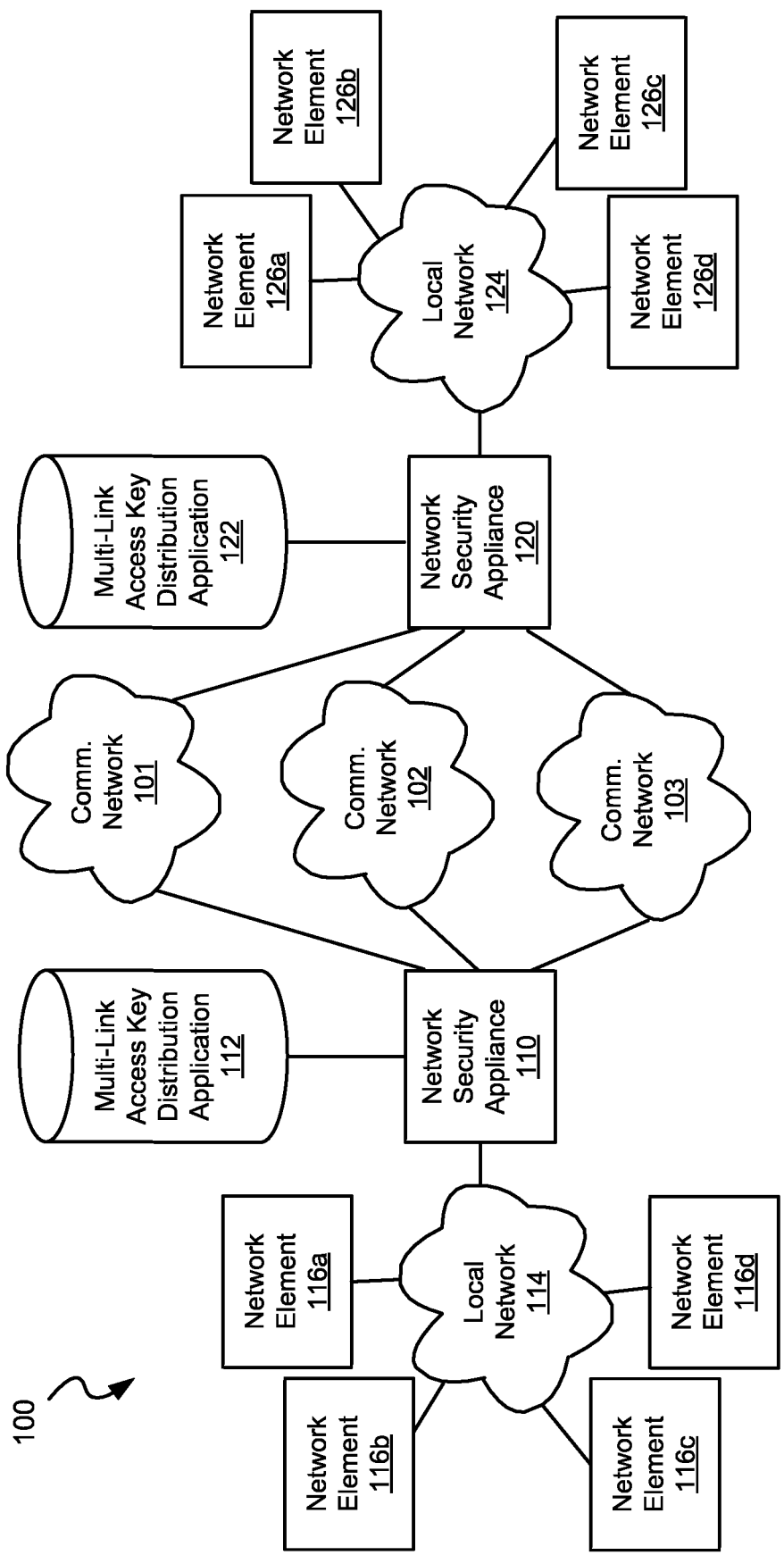
FIGS. 1A-1C illustrate a network architecture including a multi-path security system in accordance with some embodiments.

Various embodiments provide systems and methods for leveraging SD-WAN's property of redundant independent paths to enable out of band key exchange using the collection of available paths, dynamically managing link failures to keep the separation whenever possible, and/or signaling availability of quantum-safe data transfer to SD-WAN to enable quantum-safety to be used in SD-WAN policy decisions.

Various embodiments utilize multiple network communication paths to segregate key exchange processes from encrypted data transfer processes. In some instances, the two or more of the multiple network paths are supported by different communications providers, thereby providing a further security enhancement. In various instances, the multiple network communication paths are distinct from end to end to limit the possibility of an attacker seeing both data and keys on the same communication path. Such distinctness may, for example, preclude use of common infrastructure between the multiple network communication paths. Such embodiments perform, where possible, key exchange (or at least a portion thereof) for Internet Protocol Security (IPSec) on one communication path, and transfer data on a separate communication path.

In some cases, a system that to segregates keys from encrypted data may be integrated into a software-defined wide area network (SD-WAN) having at least two WAN links from two different operators (e.g., an internet service provider (ISP) A and an ISP B), and one single hub site, also with WAN links from the same ISPs. In a standard SD-WAN implementation, IPSec tunnels would be established to the hub over each of the WAN links, but such may not be quantum-secure. To address this security issue, the embodiment sends an out of band key exchange over a communication path provided by ISP A for encrypted data transferred via a communication path provided by ISP B; and an out of band key exchange over a communication path provided by ISP B for encrypted data transferred via a communication path provided by ISP A. Such an approach ensures that if an attacker should be recording data on either of these links, there will not be enough data (even with a quantum computer) to decrypt the encrypted data.

In such an embodiment, the communication paths are terminated on the same pair of network elements (e.g., network gateways (spoke and hub)). To created such bifurcated secure data transfer is done similar to that performed in standard internet key exchange (IKE) protocol, but with the key being sent over one communication link and the encrypted data sent over another communication link. Which communication link performs key exchange and which performs encrypted data exchange may be randomly selected, based upon a default configuration, or based upon the relative characteristics of the available communication paths (this could be useful when for example two out of three communication path are provided by the same operator, in which case the selection should prioritize the other operator).

The out-of-band key exchange could be sent in addition to the in-band Diffie Hellman, keeping the normal IKE signaling for each tunnel on its "normal" path, then but independently sharing a key over the secondary path. This key exchange could be another Diffie Hellman exchange, or some other method, then combined with the normal Diffie Hellman key for the derivation of session keys. Based upon the disclosure provided herein, one of ordinary skill in the art will recognize a variety of approaches that may be used where augmenting the in-band Diffie Hellman is desired.

The greater the difference between the selected communication paths, the greater the security of the secure data transfer. To this end, it is noted the potential aggregation of the two communication paths that can happen at two points:

(1) In the transport network: even two different ISPs could find themselves sharing transport links; and/or
(2) At the hub itself. Many SD-WAN implementations don't have a one-to-one mapping of ISPs between hub and spoke, and in the worst case, the hub may only have a single WAN link.

Case 2 can be avoided by ensuring that distinct WAN links are provisioned at the hub. Case 1 is potentially more difficult to avoid since the customer generally does not have visibility of the end-to-end path. However, even if an attacker has access to an aggregated link (i.e., to both key exchange and encrypted data), there is still a considerable difficulty in correlating the two sessions. In a traditional IPSec case, the endpoints of the IKE session carrying the exchange and the encapsulating security payload (ESP) session carrying the data would be the same. In the quantum-safe case proposed here, the addresses are different.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for performing multi-path secure data transfers. The methods include: identifying, by a processing resource, a first communication path designated for transferring key information and a second communication path designated for transferring encrypted data; receiving, by the processing resource, a request to transfer a data set to a recipient; performing, by the processing resource, a key exchange via the first communication path; and transferring, by the processing resource, an encrypted data set corresponding to the data set to the recipient via the second communication path. The encrypted data is decryptable using the key information.

In some instances of the aforementioned embodiments, the first communication path and the second communication path are distinct from one another at least from the processing resource to a network gateway associated with the recipient. In various instances of the aforementioned embodiments, the first communication path and the second communication path do not have any common infrastructure at least from the processing resource to a network gateway associated with the recipient. In some instances of the aforementioned embodiments, the first communication path is provided by a first commercial entity, and the second communication path is provided by a second commercial entity.

In some instances of the aforementioned embodiments where the data set is a first data set, the encrypted data set is a first encrypted data set, and the key is a first key, the methods further include: determining, by the processing resource, that the first communication path is inoperable; identifying, by the processing resource, a third communication path; and designating, by the processing resource, the third communication path for transferring key information for the first second communication path.

In various instances of the aforementioned embodiments where the data set is a first data set, the encrypted data set is a first encrypted data set, the key is a first key, the methods further include: determining, by the processing resource, that the first communication path is inoperable; and designating, by the processing resource, the first communication path for both transferring key information for transferring encrypted data. In some such instances, the methods further include precluding, by the processing resource, transfer of the encrypted data via the first communication path where the encrypted data is not identified as quantum safe.

In some instances of the aforementioned embodiments where the key exchange is a first key exchange, the data set is a first data set, the encrypted data is first encrypted data, the key information is first key information, the methods further include: designating, by the processing resource, the first communication path for transferring second encrypted data in addition to first key information; designating, by the processing resource, the second communication path for transferring second key information in addition to first encrypted data where the second encrypted data is decryptable using the second key information; receiving, by the processing resource, a request to transfer a second data set to the recipient; performing, by the processing resource, a second key exchange via the second communication path, wherein the second key exchange involves the second key information; and transferring, by the processing resource, a second encrypted data set corresponding to the second data set to the recipient via the first communication path.

Other embodiments provide systems for performing multi-path secure data transfers. Such systems include a processing resource, and a non-transient computer readable medium coupled to the processing resource. The non-transient computer readable medium has stored therein instructions that when executed by the processing resource cause the processing resource to: identify a first communication path designated for transferring key information and a second communication path designated for transferring encrypted data where the encrypted data is decryptable using the key information; receive a request to transfer a data set to a recipient; perform a key exchange via the first communication path; and transfer an encrypted data set corresponding to the data set to the recipient via the second communication path.

Yet other embodiments provide non-transient computer readable media having stored therein instructions that when executed by the processing resource cause the processing resource to: identify a first communication path designated for transferring key information and a second communication path designated for transferring encrypted data where the encrypted data is decryptable using the key information; receive a request to transfer a data set to a recipient; perform a key exchange via the first communication path; and transfer an encrypted data set corresponding to the data set to the recipient via the second communication path.

Turning to FIG. 1A, network architecture 100 is shown in accordance with some embodiments. In the context of network architecture 100, a number of network elements (e.g., a network element 116a, a network element 116b, a network element 116c, a network element 116d, a network element 126a, a network element 126, a network element 126c, and a network element 126d) are coupled to respective local networks (e.g., a local network 114 and a local network 124). Local networks 114, 124 may be any type of communication network known in the art. Those skilled in the art will appreciate that, each of local networks 114, 124 can be wireless network, a wired network, or a combination thereof that can be implemented as one of the various types of networks, such as an Intranet, a Local Area Network (LAN), a Wide Area Network (WAN), an Internet, and the like. Further, local networks 114, 124 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110, and access to local network 124 is controlled by a network security appliance 120. A number of communication networks (e.g., communication network 101, communication network 102, and communication network 103) couple local network 114 to local network 124. Communication networks 101, 102, 103 may be any type of communication network known in the art. Those skilled in the art will appreciate that, each of communication networks 101, 102, 103 can be wireless network, a wired network, or a combination thereof that can be implemented as one of the various types of networks, such as an Intranet, a Local Area Network (LAN), a Wide Area Network (WAN), an Internet, and the like. Further, communication networks 101, 102, 103 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. In some embodiments, none of communication networks 101, 102, 103 share common infrastructure. In various embodiments, each of communication networks 101, 102, 103 are maintained and operated by separate communication providers.

Network security appliance 110 is coupled to a computer readable storage medium having stored thereon a multi-link access key distribution application 112. As more fully described below, multi-link access key distribution application 112 operates to segregate keys from data in communications between a network appliance 116 on local network 114 and a network element 126 on local network 124. This is done by performing key transfer operations on one of communication networks 101, 102, 103, and data transfer operations on another of communication networks 101, 102, 103. Similarly, network security appliance 120 is coupled to a computer readable storage medium having stored thereon a multi-link access key distribution application 122. As more fully described below, multi-link access key distribution application 122 operates to segregate keys from data in communications between a network appliance 116 on local network 114 and a network element 126 on local network 124. This is done by performing key transfer operations on one of communication networks 101, 102, 103, and data transfer operations on another of communication networks 101, 102, 103.

Figure 1B:
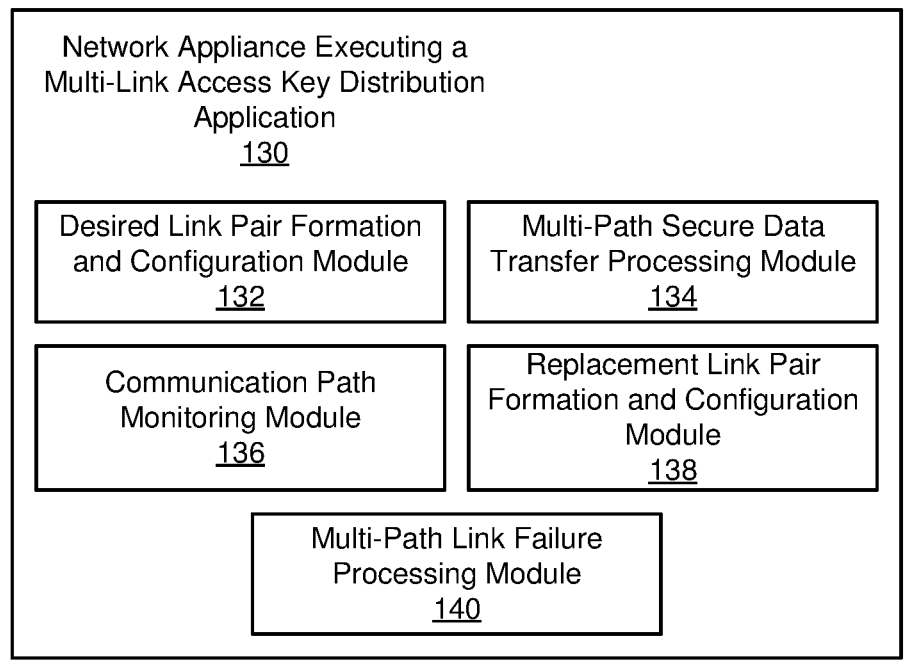

Turning to FIG. 1B, an example implementation of a network appliance executing a multi-link access key distribution application 130 (e.g., network security appliance 110 executing multi-link access key distribution application 112, or network security appliance 120 executing multi-link access key distribution application 122) is shown in accordance with some embodiments. As shown in this example, network appliance executing a multi-link access key distribution application 130 includes: a desired link pair formation and configuration module 132, a multi-path secure data transfer module 134, a communication path monitoring module 136, a replacement link pair formation and configuration module 138, and a multi-path link failure processing module 140.

Desired link pair formation and configuration module 132 is configured to identify two communication paths (e.g., a communication path via communication network 101 and a communication path via communication network 102) between network elements (e.g., network element 116a and network element 126a) between which secure communications are to be performed. In operation, the two communication paths are used in tandem to perform secure data transfers with one of the communication paths designated to perform key transfer operations and the other designed to perform encrypted data transfer operations.

Desired link pair formation and configuration module 132 is further configured to set up the desired link pair by configuring a first communication path of the desired link pair (e.g., the communication path via communication network 101) to perform key exchange, and a second communication path of the desired link pair (e.g., the communication path via communication network 102) to perform encrypted data transfer. Each of the communications paths in the desired link pair may have different characteristics. The decision of which communication path of the desired link pair to use for encrypted data and which to use for key transfer may be based in part on the difference in characteristics between the communication paths. For example, key transfer may be performed over the communication path that is expensive on a per byte basis relative to the other communication path of the desired link pair that is configured for higher volume data transfer. Desired link pair formation and configuration module 132 is configured to communicate the selection of the first communication path and the second communication path from the network gateway (e.g., network security appliance 110) executing the module to another network gateway (e.g., network security appliance 120) through which the communications will be processed.

Multi-path secure data transfer module 134 is configured to perform ongoing secure data transfer between two designated network elements using a data transfer mechanism indicated by communication path monitoring module 136. The available transfer mechanisms are: the desired link pair as configured by desired link pair formation and configuration module 132, a replacement link pair as configured by replacement link pair formation and configuration module 138, or a single communication path as dictated by multi-path link failure processing module 140.

Communication path monitoring module 136 is configured to monitor the operational state of communication paths in the desired link pair, and to direct modifications to a transfer mechanism used to transfer secure data between network elements based upon the identified operational status of communication paths in the desired link pair. In particular, where both communication paths in the desired link pair are operational, communication path monitoring module 136 directs multi-path secure data transfer module 134 to perform secure data transfers by using the first communication path of the desired link pair for key transfer and the second communication path of the desired link pair for encrypted data transfer.

Alternatively, where one of the first communication path or the second communication path of the desired link pair become inoperable and another communication path is available to perform communications, communication path monitoring module 136 directs replacement link pair formation and configuration module 138 to form a replacement link pair. In addition, communication path monitoring module 136 directs multi-path secure data transfer module 134 to perform secure data transfers by using the first communication path of the replacement link pair for key transfer and the second communication path of the replacement link pair for encrypted data transfer.

Alternatively, where one of the first communication path or the second communication path of the desired link pair become inoperable and another communication path is not available to perform communications, communication path monitoring module 136 directs communication path monitoring module 136 directs multi-path secure data transfer module 134 to perform secure data transfers by using the remaining operable communication path of the desired link pair in accordance with the transfer mechanism controlled by multi-path link failure processing module 140.

Replacement link pair formation and configuration module 138 is configured to select an available communication path to replace a communication path in the desired link pair that is become inoperable. The replacement link pair is set up by configuring a first communication path of the replacement link pair to perform key exchange, and a second communication path of the replacement link pair to perform secure data transfer. Again, each of the communications paths in the desired link pair may have different characteristics. The decision of which communication path of the replacement link pair to use for encrypted data and which to use for key transfer may be based in part on the difference in characteristics between the communication paths. Replacement link pair formation and configuration module 138 is configured to communicate the selection of the first communication path and the second communication path from the network gateway (e.g., network security appliance 110) executing the module to another network gateway (e.g., network security appliance 120) through which the communications will be processed.

Multi-path link failure processing module 140 is configured to perform data transfer processing when only one communication path remains operable for data transfer. In such a scenario, it is not possible to bifurcate secure data transfers with key information being passed over one communication path and encrypted data passed over another communication path. In such a situation, one or more approaches may be applied to allow some degree of secure data transfer. For example, in some embodiments where the communication path designated for performing key transfer becomes inoperable, key updating may be stopped while encrypted data is transferred over the remaining operable communication path using the key existing prior to the data path becoming inoperable. Alternatively, where the communication path designated for key transfer remains operable, but the communication path designated for encrypted data transfer becomes inoperable, various solutions may be applied from stopping data transfers to reconfiguring the data path designated for key transfer to be used for encrypted data transfer. Various embodiments of approaches that may be implemented in code included as part of multi-path link failure processing module 140 are discussed below in relation to FIGS. 3-6.

Figure 1C:
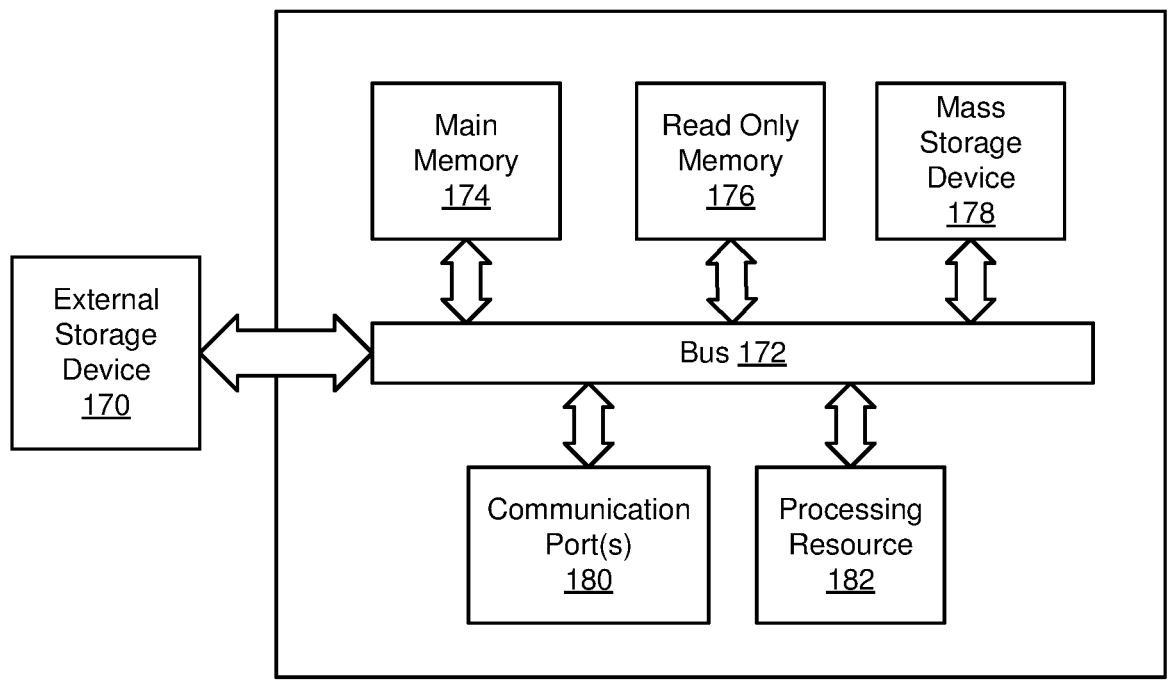

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
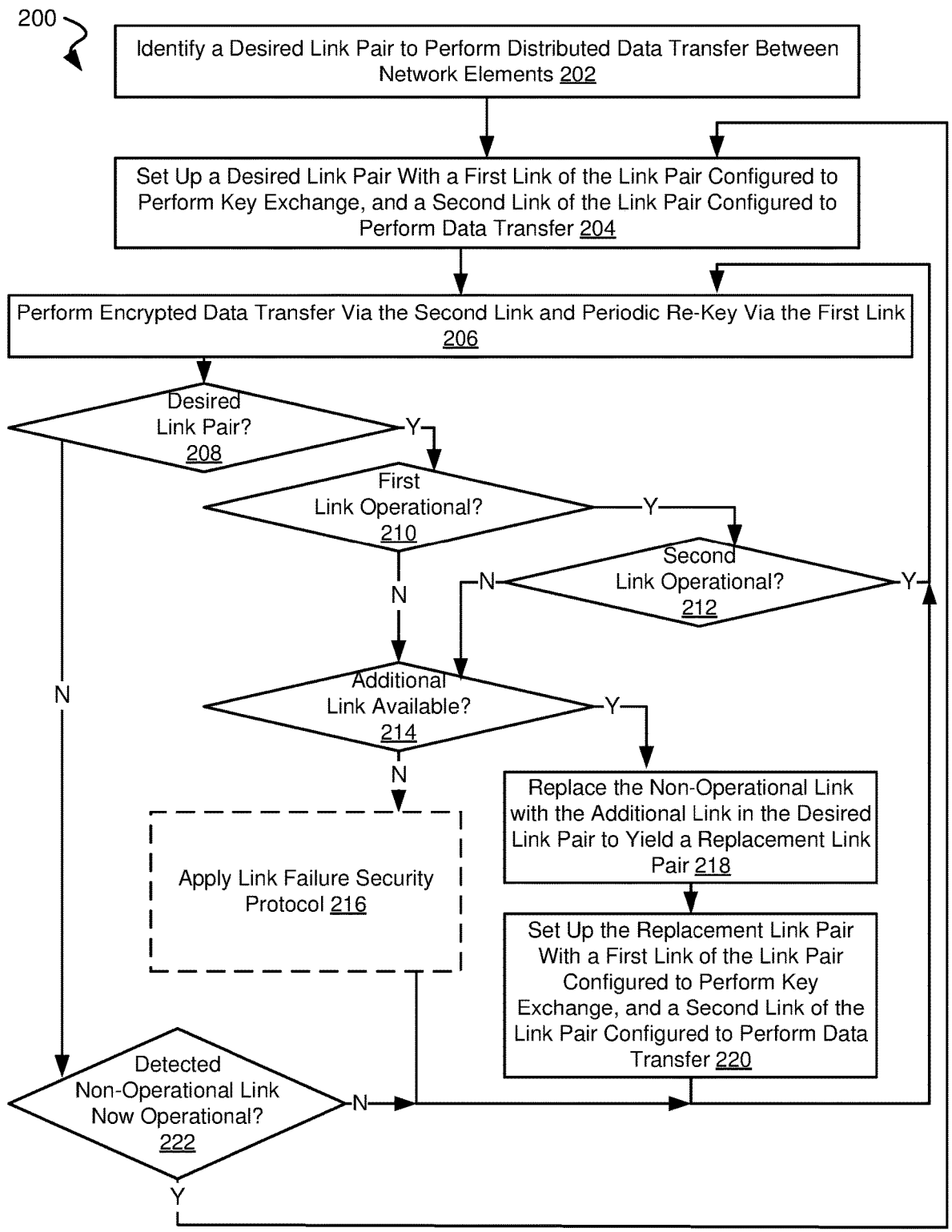
FIGS. 2-7 are flow diagrams showing methods for providing multi-path security in accordance with various embodiments.

Turning to FIG. 2, a flow diagram 200 shows a method in accordance with some embodiments for providing multi-path security. In a standard IPSec implementation, one or more of the communication paths maintained by the SD-WAN functionality may be designated for secure communications. In such a standard IPSec implementation both key exchange and data exchange are performed over the same communication path. As described above, such an approach may not be suitable in the future. In the embodiment discussed in relation to FIG. 2, a multi-path IPSec module in accordance with some embodiments automatically identifies a communication path to be used for key transfer in relation to another communication path for encrypted data transfer. Thus, data will be transferred on one communication, and the key exchange will be performed on another communication path. Key exchange may be performed on the same communication path that is used to transfer data unrelated to the key. Thus, using a two communication path example, the one communication path may be designated a first communication path to handle transfer of a first data type (e.g., voice over IP (VOIP) data), and a second communication path to handle transfer of a second data type (e.g., large file transfers). Key exchange to facilitate decryption of the first data type would be performed over the second communication path (i.e., a communication path different from that where the first data type is transferred), and key exchange to facilitate decryption of the second data type would be performed over the first communication path (i.e., a communication path different from that where the second data type is transferred).

Following flow diagram 200, a desired link pair is identified to perform distributed data transfer between network elements (block 202). A desired link pair includes any two network communication paths between the respective network elements. Thus, for example, a link pair may include a communication path via communication network 101 and another communication path via communication network 102. In some cases, the cost of transferring information via one of the paths may be more than that of the other path and/or the bandwidth or latency may be different for one path than for the other. In such cases, one communication path in the linked pair may be designated for transferring keys and the other for encrypted data.

The desired link pair is set up by configuring a first communication path of the desired link pair to perform key exchange, and a second communication path of the desired link pair to perform encrypted data transfer (block 204). As mentioned above, each of the communications paths in the desired link pair may have different characteristics. The decision of which communication path of the desired link pair to use for data and which to use for key transfer may be based in part on the difference in characteristics between the communication paths. For example, key transfer may be performed over the communication path that is expensive on a per byte basis relative to the other communication path of the desired link pair that is configured for higher volume data transfer. This configuration information is sent from one network gateway (e.g., network security appliance 110) to another network gateway (e.g., network security appliance 120) through which the communications will be processed.

Encrypted data transfer is performed over a link pair with periodic key updates sent via the first communication path and key encrypted data transfers being sent via the second communication path (block 206). The network gateway receiving the transferred keys and encrypted data from two different communication paths uses the key information received from one communication path to decrypt encrypted data received via the other communication path. The decrypted data is then sent to the destination network element (e.g., one of network elements 116, 126). The transfer of keys over the first communication link includes a changing or updating of the key periodically. Such updating of the key assures that a key may only be used for a short period of time, thus mitigating the impact from the potential discovery of a key.

In parallel to data and key transfers, switching of communications paths included in the desired link pair may be done to account for failure of one link or another, but it is desired to revert back to the desired link pair whenever possible. As such, it is determined whether encrypted data and key transfers are being carried out by the desired link pair (block 208). Where encrypted data and key transfers are being performed via the desired link pair (block 208), it is determined if the first communication path of the desired link pair is operational (block 210). Where it is determined that the first communication path of the desired link pair is operational (block 210), it is determined if the first communication path of the desired link pair is operational (block 212). Where it is determined that the second communication path of the desired link pair is operational (block 212), data transfer continues using the communication paths in the desired link pair (block 206).

Alternatively, where it is determined that data and key transfers are being carried out by the desired link pair (block 208), but either the first communication path of the desired link pair is not operational (block 210) or the second communication path of the desired link pair is not operational (block 212), it is determined if another communication path (e.g., a communication path via communication network 103) is available to transfer the information previously carried over the now non-operational communication path (block 214). Where another communication path is available (block 214) the available communication path is configured to take over the transfer responsibilities (data or key) of the now non-operational communication link (block 218).

The replacement link pair is set up by configuring a first communication path of the replacement link pair to perform key exchange, and a second communication path of the replacement link pair to perform data transfer (block 220). Again, each of the communications paths in the desired link pair may have different characteristics. The decision of which communication path of the replacement link pair to use for data and which to use for key transfer may be based in part on the difference in characteristics between the communication paths. This configuration information is sent from one network gateway (e.g., network security appliance 110) to another network gateway (e.g., network security appliance 120) through which the communications will be processed. This results in creation of a replacement link pair that will operate in place of the desired link pair for ongoing data transfers (block 206).

Alternatively where it is determined that the desired link pair is not being used because of the inoperability of one or both communication paths in the desired link pair (block 208), it is determined whether the previously non-operational communication path has now become operational (block 222). Thus, for example, where data transfers are being performed over the original first communication path of the desired link pair and an alternative communication path to the original second communication path of the desired link pair due to earlier inoperability, it is determined whether the original second communication path of the desired link pair is again operational. As another example, where data transfers are being performed over the original second communication path of the desired link pair and an alternative communication path to the original first communication path of the desired link pair due to earlier inoperability, it is determined whether the original first communication path of the desired link pair is again operational. Where the previously non-operational communication path has now become operational (block 222), the original desired link pair is reconfigured to include the newly operational communication path (block 204).

Alternatively, where it is determined that data and key transfers are being carried out by the desired link pair (block 208), either the first communication path of the desired link pair is not operational (block 210) or the second communication path of the desired link pair is not operational (block 212), and another communication path is not available (block 214), a link failure security protocol is applied where data transfer is continued over a non-bifurcated communication path (block 216). Block 216 is shown in dashed lines as it includes a number of processes that may be performed in a variety of ways as more fully discussed below in relation to FIGS. 3-6.

Figure 3:
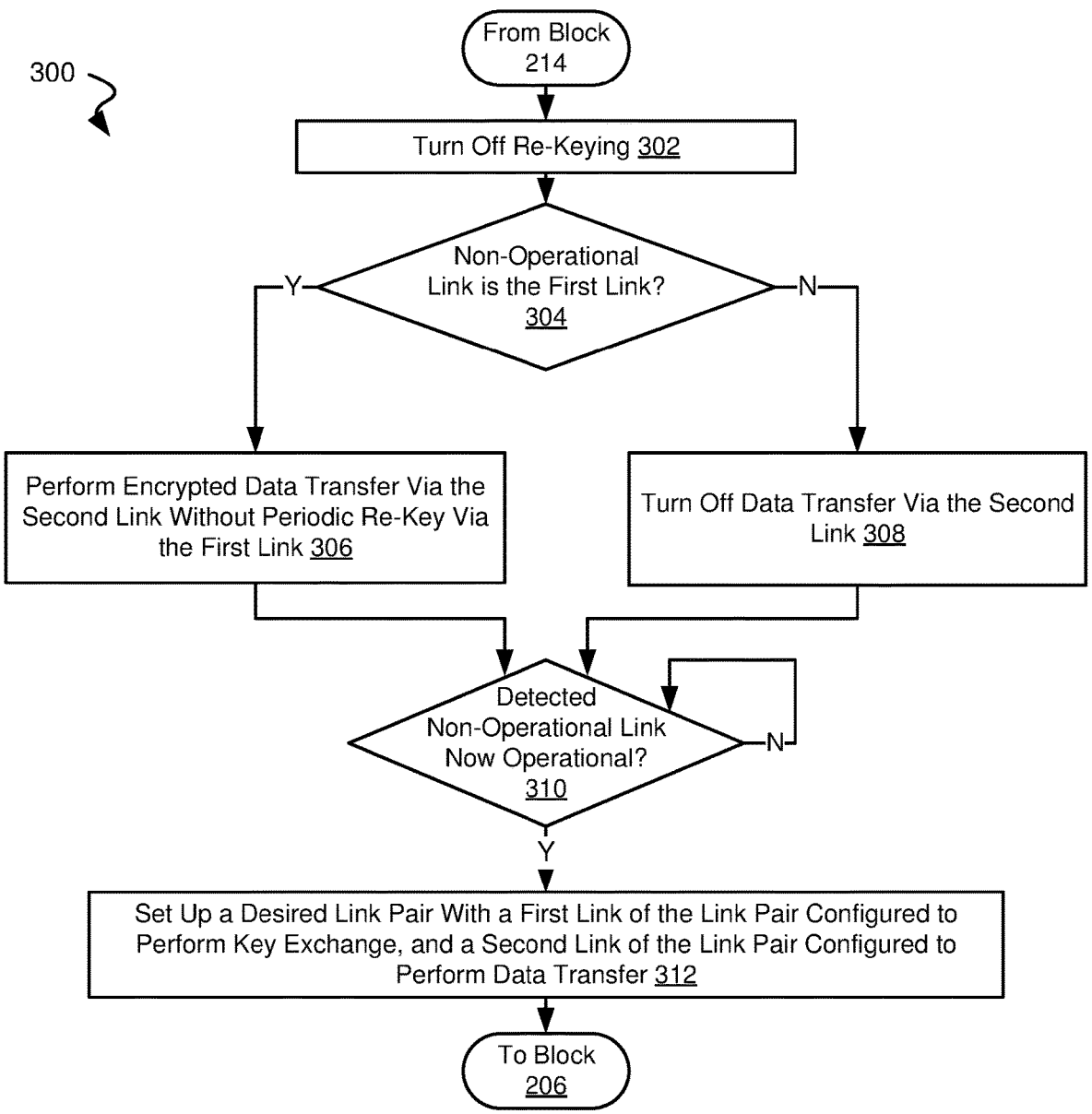

Turning to FIG. 3, a flow diagram 300 shows a method for implementing a link failure security protocol is shown in accordance with some embodiments. Following flow diagram 300, processing begins from block 214 of FIG. 2 (or block 714 of FIG. 7 described below), and starts with turning of the periodic changing or updating of the key (i.e., turning off re-keying) (block 302). As mentioned above, the key us changed or updated periodically when two communication paths area available. Where one of the communication paths has become inoperable and cannot be replaced by another communication path, re-keying is stopped allowing data transfers to continue using the last key over a single communication link. It is determined whether the discovered non-operational communication path is the first communication path configured to perform key transfers (block 304). Where the discovered non-operational communication path is the first communication path (block 304), transfer of encrypted data continues over the second communication path using the previously existing key (block 306). Alternatively, where the discovered non-operational communication path is not the first communication path (block 304), data transfers via the second communication path are stopped (block 308).

With the aforementioned data transfer condition ongoing, it is determined whether the discovered non-operational communication path has now become operational (block 310). Once the discovered non-operational communication path becomes operational again (block 310), the desired link pair is set up by configuring a first communication path of the desired link pair to perform key exchange, and a second communication path of the desired link pair to perform data transfer (block 312) and processing is returned to block 206 of FIG. 2 (or block 706 of FIG. 7 described below).

Figure 4:
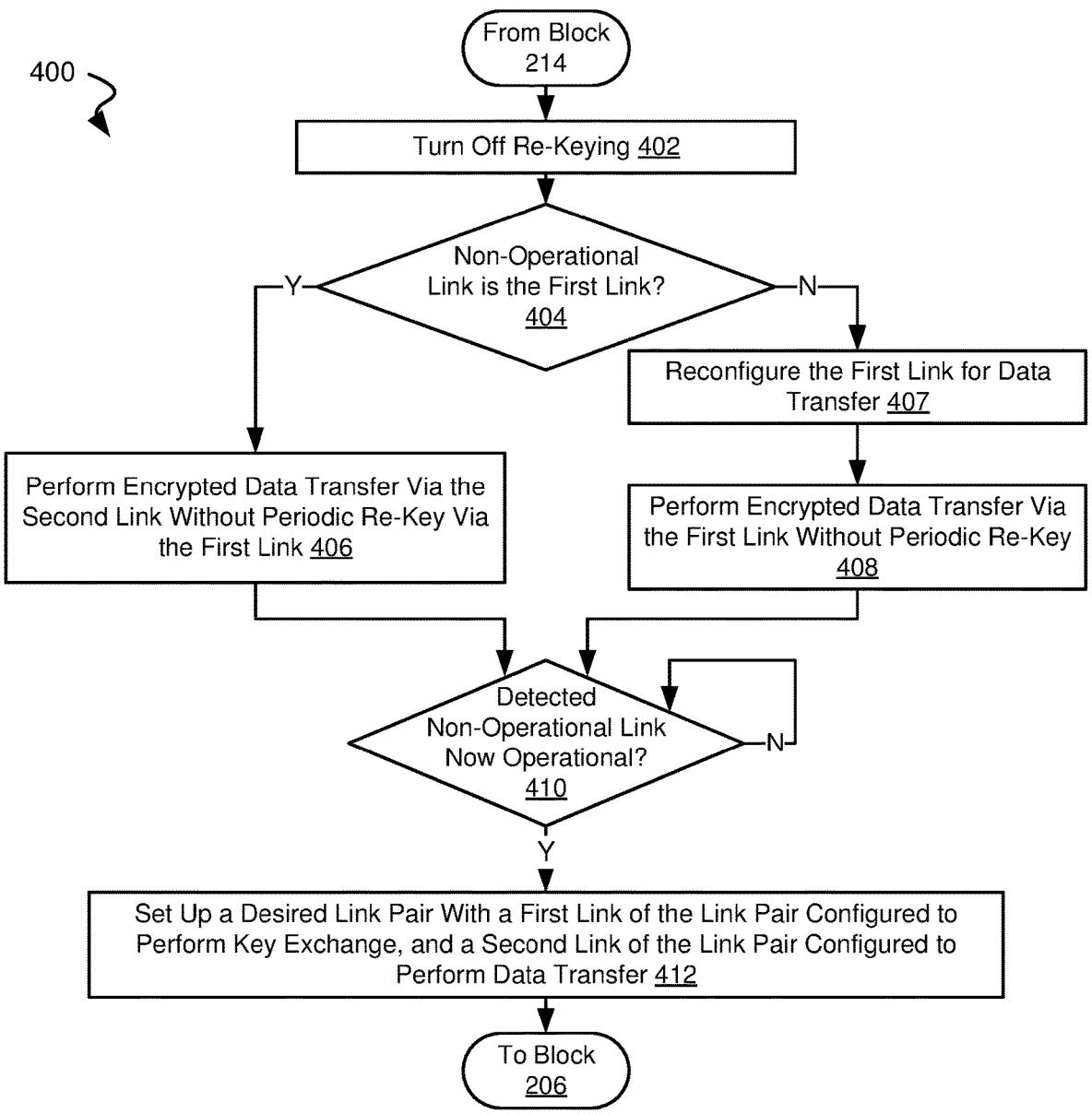

Turning to FIG. 4, a flow diagram 400 shows a method for implementing a link failure security protocol is shown in accordance with various embodiments. Following flow diagram 400, processing begins from block 214 of FIG. 2 (or block 714 of FIG. 7 described below), and starts with turning of the periodic changing or updating of the key (i.e., turning off re-keying) (block 402). As mentioned above, the key us changed or updated periodically when two communication paths area available. Where one of the communication paths has become inoperable and cannot be replaced by another communication path, re-keying is stopped allowing data transfers to continue using the last key over a single communication link. It is determined whether the discovered non-operational communication path is the first communication path configured to perform key transfers (block 404). Where the discovered non-operational communication path is the first communication path (block 404), transfer of encrypted data continues over the second communication path using the previously existing key (block 406).

Alternatively, where the discovered non-operational communication path is not the first communication path (i.e., is the second communication path) (block 404), the first link is configured to perform data transfers rather than key transfer (block 407). This includes communication between one network gateway (e.g., network security appliance 110) to another network gateway (e.g., network security appliance 120) through which the communications will be processed. Encrypted data transfer is then carried out over the first communication path using the previously existing key (block 408).

With the aforementioned data transfer condition ongoing, it is determined whether the discovered non-operational communication path has now become operational (block 410). Once the discovered non-operational communication path becomes operational again (block 410), the desired link pair is set up by configuring a first communication path of the desired link pair to perform key exchange, and a second communication path of the desired link pair to perform data transfer (block 412) and processing is returned to block 206 of FIG. 2 (or block 706 of FIG. 7 described below).

Figure 5:
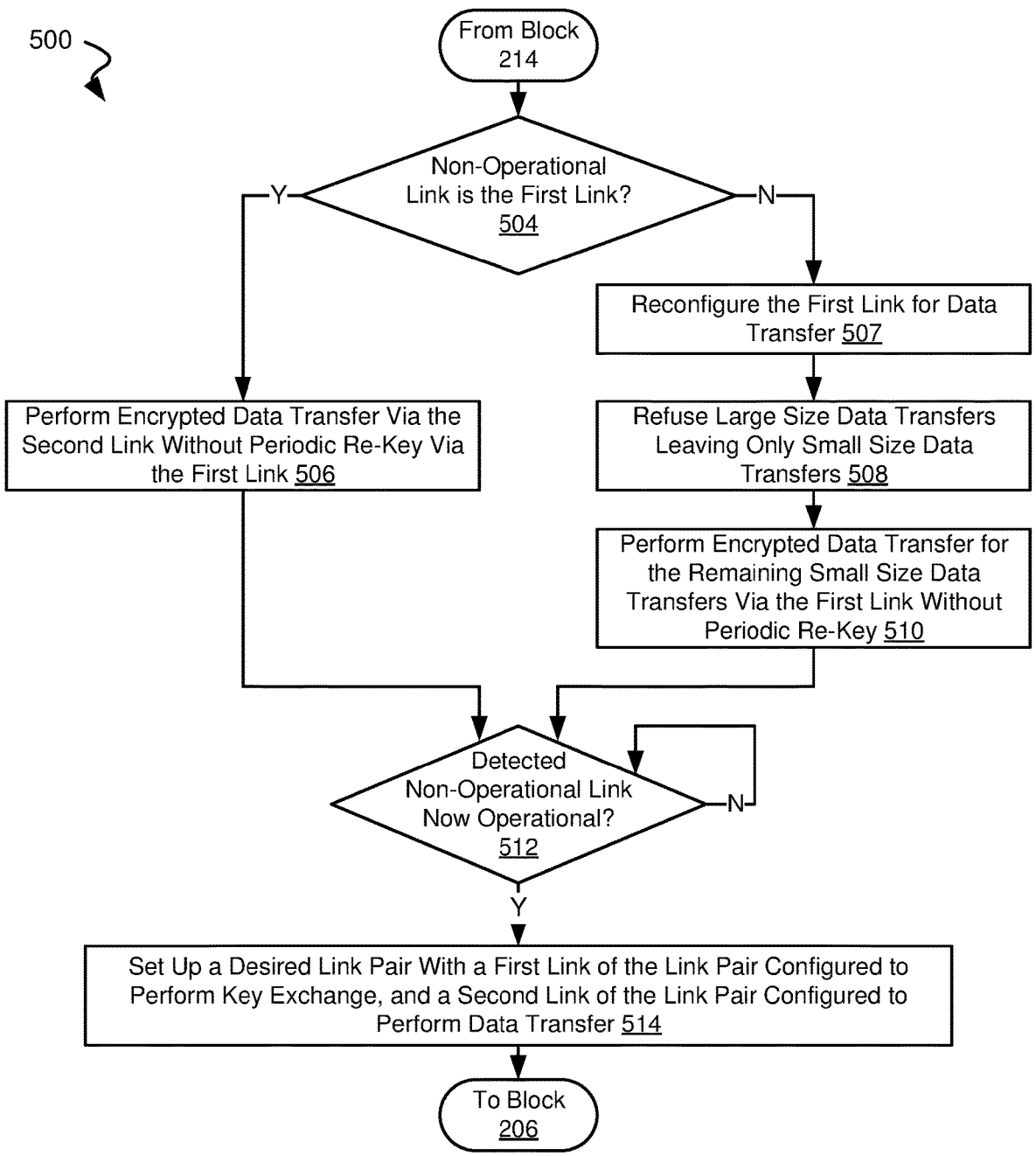

Turning to FIG. 5, a flow diagram 500 shows a method for implementing a link failure security protocol is shown in accordance with some embodiments. Following flow diagram 500, processing begins from block 214 of FIG. 2 (or block 714 of FIG. 7 described below), and starts by determining whether the discovered non-operational communication path is the first communication path configured to perform key transfers (block 504). Where the discovered non-operational communication path is the first communication path (block 504), transfer of encrypted data continues over the second communication path using the previously existing key (block 506).

Alternatively, where the discovered non-operational communication path is not the first communication path (i.e., is the second communication path) (block 504), the first link is configured to perform data transfers rather than key transfer (block 507). This includes communication between one network gateway (e.g., network security appliance 110) to another network gateway (e.g., network security appliance 120) through which the communications will be processed, and results in turning off any re-keying. Any large size data transfers may be refused (block 508). This is useful where the first communication path was originally designated for key transfer because the communication path is relatively expensive on a per byte basis. Encrypted data transfer is then carried out for only relatively small size data transfers over the first communication path using the previously existing key (block 510). A small size data transfer is any transfer of a size less than a programmable threshold, and a large size data transfer is any transfer of a size greater than or equal to the programmable threshold. In one embodiment, a small size data transfer is any transfer of a size less than 20 MB, and a large size data transfer is any transfer of a size greater than or equal to 20 MB. Based upon the disclosure provided herein, one of ordinary skill in the art will recognize a variety of transfer sizes that may be used to differentiate between a large size data transfer and a small size data transfer in accordance with different embodiments.

With the aforementioned data transfer condition ongoing, it is determined whether the discovered non-operational communication path has now become operational (block 512). Once the discovered non-operational communication path becomes operational again (block 512), the desired link pair is set up by configuring a first communication path of the desired link pair to perform key exchange, and a second communication path of the desired link pair to perform data transfer (block 514) and processing is returned to block 206 of FIG. 2 (or block 706 of FIG. 7 described below).

Figure 6:
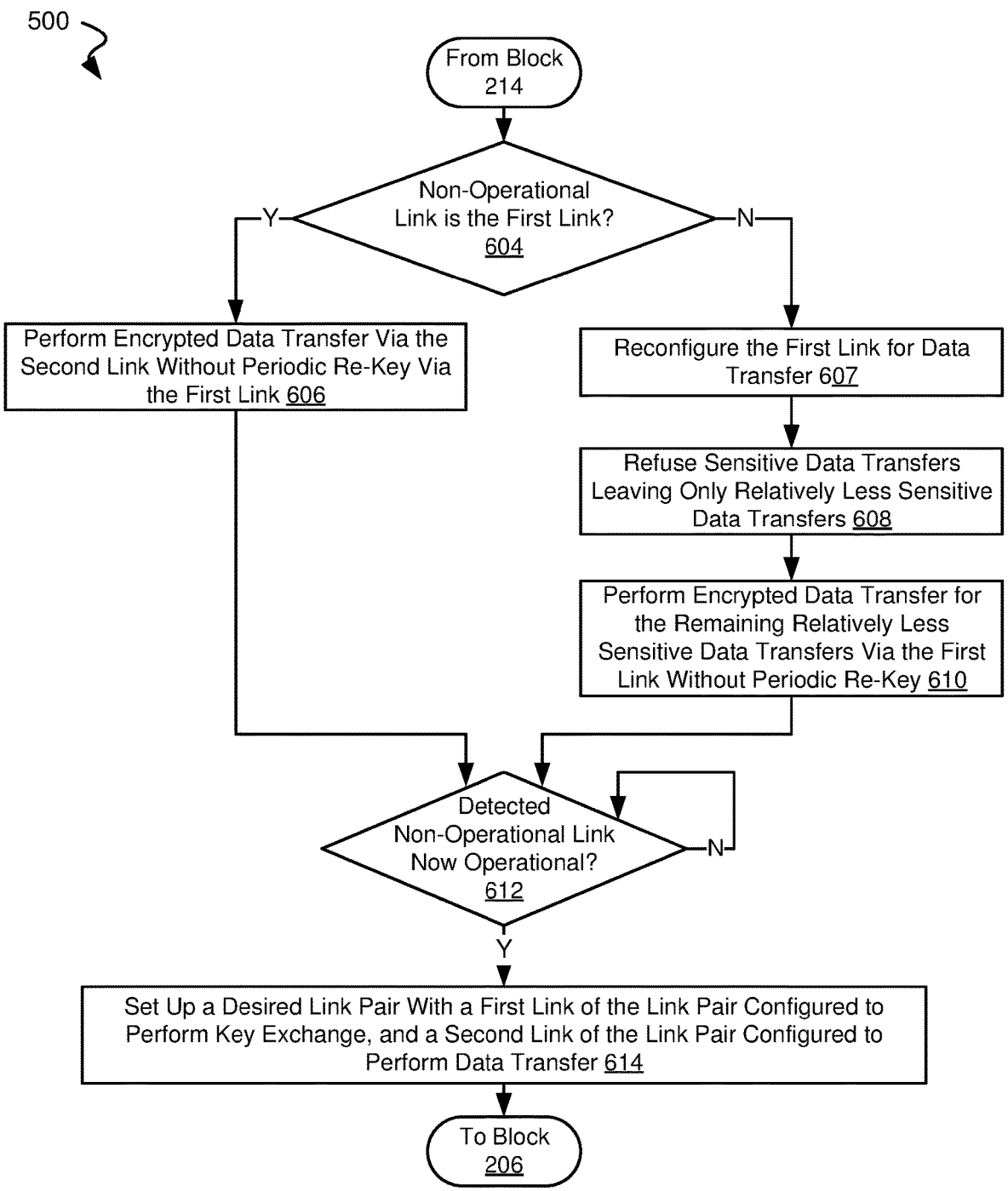

Turning to FIG. 6, a flow diagram 600 shows a method for implementing a link failure security protocol is shown in accordance with various embodiments. Following flow diagram 600, processing begins from block 214 of FIG. 2 (or block 714 of FIG. 7 described below), and starts by determining whether the discovered non-operational communication path is the first communication path configured to perform key transfers (block 604). Where the discovered non-operational communication path is the first communication path (block 604), transfer of encrypted data continues over the second communication path using the previously existing key (block 606).

Alternatively, where the discovered non-operational communication path is not the first communication path (i.e., is the second communication path) (block 604), the first link is configured to perform data transfers rather than key transfer (block 607). This includes communication between one network gateway (e.g., network security appliance 110) to another network gateway (e.g., network security appliance 120) through which the communications will be processed, and results in turning off any re-keying. Any sensitive data transfers may be refused (block 608). Each data transfer may be designated by its level of sensitivity, and in this case where the level of security exceeds a particular threshold, it is refused. Sensitive data transfers may include, but are not limited to, financial transactions, accesses to/from a secure database, or the like. Based upon the disclosure provided herein, one of ordinary skill in the art will recognize a variety of data transfer operations that may be designated sensitive in accordance with different embodiments. Encrypted data transfer is then carried out for only relatively less sensitive data transfers over the first communication path using the previously existing key (block 610).

With the aforementioned data transfer condition ongoing, it is determined whether the discovered non-operational communication path has now become operational (block 612). Once the discovered non-operational communication path becomes operational again (block 612), the desired link pair is set up by configuring a first communication path of the desired link pair to perform key exchange, and a second communication path of the desired link pair to perform data transfer (block 614) and processing is returned to block 206 of FIG. 2 (or block 706 of FIG. 7 described below).

Figure 7:
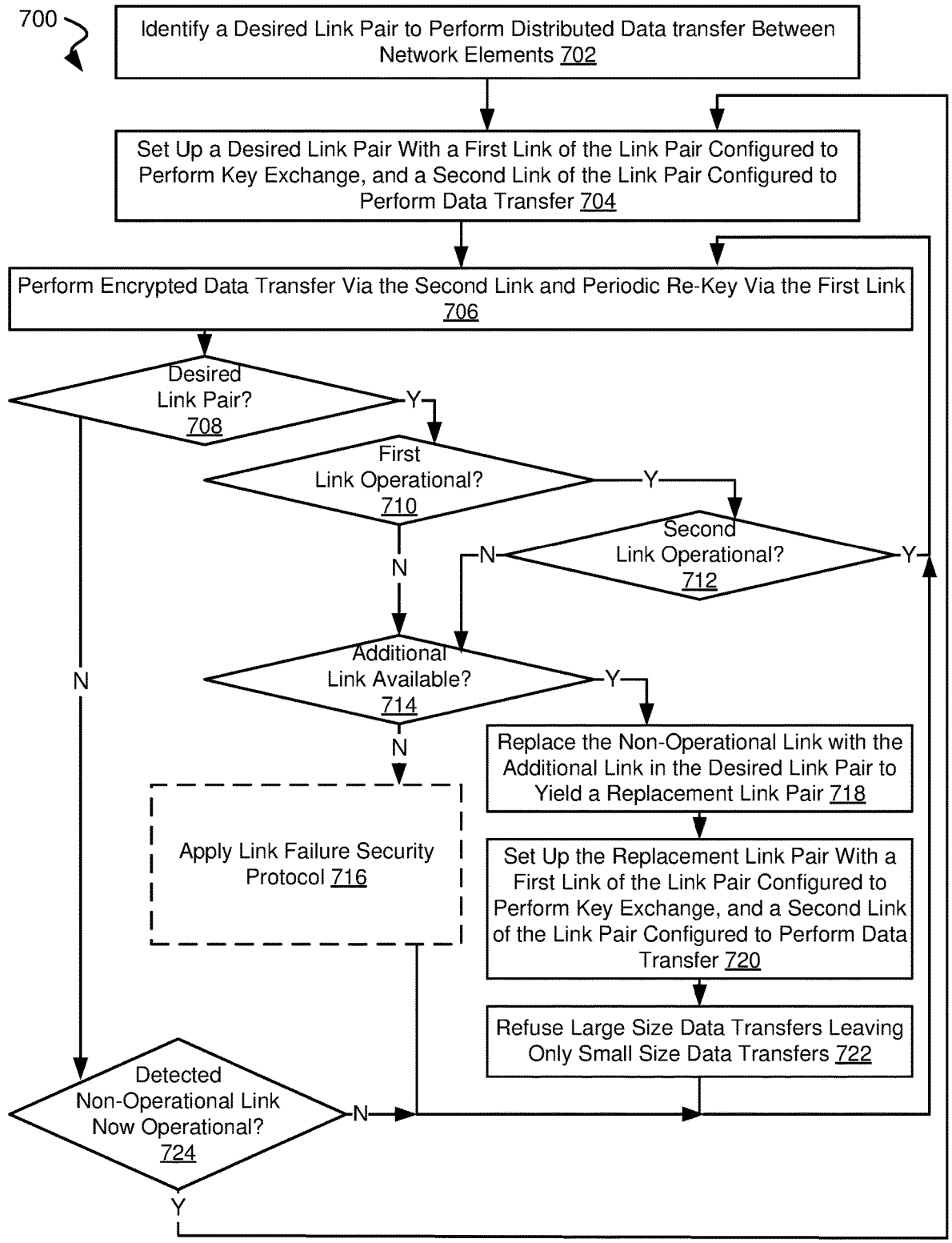

Turning to FIG. 7, a flow diagram 700 shows a method in accordance with other embodiments for providing multi-path security. Following flow diagram 700, a desired link pair is identified to perform distributed data transfer between network elements (block 702). A desired link pair includes any two network communication paths between the respective network elements. Thus, for example, a link pair may include a communication path via communication network 101 and another communication path via communication network 102. In some cases, the cost of transferring information via one of the paths may be more than that of the other path and/or the bandwidth or latency may be different for one path than for the other. In such cases, one communication path in the linked pair may be designated for transferring keys and the other for data.

The desired link pair is set up by configuring a first communication path of the desired link pair to perform key exchange, and a second communication path of the desired link pair to perform data transfer (block 704). As mentioned above, each of the communications paths in the desired link pair may have different characteristics. The decision of which communication path of the desired link pair to use for data and which to use for key transfer may be based in part on the difference in characteristics between the communication paths. For example, key transfer may be performed over the communication path that is expensive on a per byte basis relative to the other communication path of the desired link pair that is configured for higher volume data transfer. This configuration information is sent from one network gateway (e.g., network security appliance 110) to another network gateway (e.g., network security appliance 120) through which the communications will be processed.

Encrypted data transfer is performed over a link pair with periodic key updates sent via the first communication path and key encrypted data transfers being sent via the second communication path (block 706). The network gateway receiving the transferred keys and encrypted data from two different communication paths uses the key information received from one communication path to decrypt encrypted data received via the other communication path. The decrypted data is then sent to the destination network element (e.g., one of network elements 116, 126). The transfer of keys over the first communication link includes a changing or updating of the key periodically. Such updating of the key assures that a key may only be used for a short period of time, thus mitigating the impact from the potential discovery of a key.

In parallel to data and key transfers, switching of communications paths included in the link pair may be done to account for failure of one link or another, but it is desired to move to the desired link pair whenever possible. As such, it is determined whether data and key transfers are being carried out by the desired link pair (block 708). Where data and key transfers are being performed via the desired link pair (block 708), it is determined if the first communication path of the desired link pair is operational (block 710). Where it is determined that the first communication path of the desired link pair is operational (block 710), it is determined if the first communication path of the desired link pair is operational (block 712). Where it is determined that the second communication path of the desired link pair is operational (block 712), data transfer continues using the communication paths in the desired link pair (block 706).

Alternatively, where it is determined that data and key transfers are being carried out by the desired link pair (block 708), but either the first communication path of the desired link pair is not operational (block 710) or the second communication path of the desired link pair is not operational (block 712), it is determined if another communication path (e.g., a communication path via communication network 103) is available to transfer the information previously carried over the now non-operational communication path (block 714). Where another communication path is available (block 714), the available communication path is configured to take over the transfer responsibilities (data or key) of the now non-operational communication link (block 718).

The replacement link pair is set up by configuring a first communication path of the replacement link pair to perform key exchange, and a second communication path of the replacement link pair to perform data transfer (block 720). Again, each of the communications paths in the desired link pair may have different characteristics. The decision of which communication path of the replacement link pair to use for data and which to use for key transfer may be based in part on the difference in characteristics between the communication paths. This configuration information is sent from one network gateway (e.g., network security appliance 110) to another network gateway (e.g., network security appliance 120) through which the communications will be processed.

Any large size data transfers may be refused (block 722). This is useful where the first communication path was originally designated for key transfer because the communication path is relatively expensive on a per byte basis. This results in creation of a replacement link pair that will operate in place of the desired link pair for ongoing data transfers of only relatively small size (block 706). A small size data transfer is any transfer of a size less than a programmable threshold, and a large size data transfer is any transfer of a size greater than or equal to the programmable threshold. In one embodiment, a small size data transfer is any transfer of a size less than 20 MB, and a large size data transfer is any transfer of a size greater than or equal to 20 MB. Based upon the disclosure provided herein, one of ordinary skill in the art will recognize a variety of transfer sizes that may be used to differentiate between a large size data transfer and a small size data transfer in accordance with different embodiments.

Alternatively where it is determined that the desired link pair is not being used because of the inoperability of one or both communication paths in the desired link pair (block 708), it is determined whether the previously non-operational communication path has now become operational (block 724). Thus, for example, where data transfers are being performed over the original first communication path of the desired link pair and an alternative communication path to the original second communication path of the desired link pair due to earlier inoperability, it is determined whether the original second communication path of the desired link pair is again operational. As another example, where data transfers are being performed over the original second communication path of the desired link pair and an alternative communication path to the original first communication path of the desired link pair due to earlier inoperability, it is determined whether the original first communication path of the desired link pair is again operational. Where the previously non-operational communication path has now become operational (block 724), the original desired link pair is reconfigured to include the newly operational communication path (block 704).

Alternatively, where it is determined that data and key transfers are being carried out by the desired link pair (block 708), either the first communication path of the desired link pair is not operational (block 710) or the second communication path of the desired link pair is not operational (block 712), and another communication path is not available (block 714), a link failure security protocol is applied where data transfer is continued over a non-bifurcated communication path (block 716). Block 716 is shown in dashed lines as it includes a number of processes that may be performed in a variety of ways as more fully discussed below in relation to FIGS. 3-6.

Figure 8:
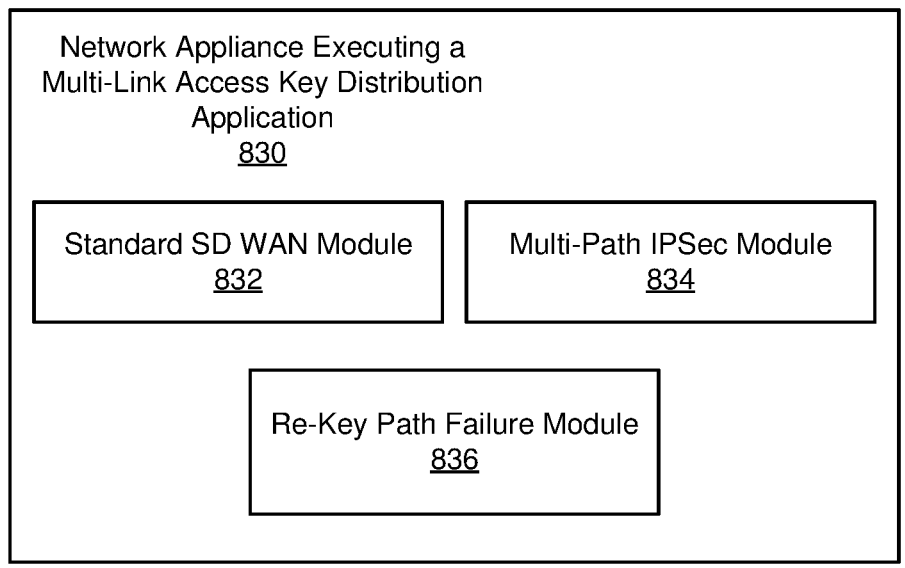
FIGS. 8-9 show systems and methods for providing multi-path security using standard SD-WAN communication path setup and maintenance along with a multi-path IPSec module in accordance with some embodiments.

Turning to FIG. 8, an example implementation of a network appliance executing a multi-link access key distribution application 830 (e.g., network security appliance 110 executing multi-link access key distribution application 112, or network security appliance 120 executing multi-link access key distribution application 122) is shown in accordance with various embodiments. As shown in this example, network appliance executing a multi-link access key distribution application 830 includes: a standard SD-WAN module 832, a multi-path IPSec Module 834, and a re-key path failure module 836.

Standard SD-WAN module 832 is configured to perform functions in relation to establishing and maintaining communication paths in an SD-WAN application. Based upon the disclosure provided herein, one of ordinary skill in the art will recognize a variety of SD-WAN functionality that may be provided as part of standard SD-WAN module 832 in accordance with various embodiments.

Multi-path IPSec Module 834 is configured to establish multi-path IPSec communication processes where key exchange is performed on one communication path and encrypted data is transferred on a separate communication path. In some embodiments, multi-path IPSec Module 834 is configured to perform the multi-path IPSec communication processes discussed below in relation to FIG. 9.

Re-key path failure module 836 is configured to identify failures in either a communication path used for key exchange or a communication path used for corresponding encrypted data exchange, and to address the failure by, for example, temporarily stopping key exchange or assuring that only quantum safe data is transferred. In some embodiments, re-key path failure module 836 is configured to perform the failure processes discussed below in relation to FIG. 9.

Figure 9:
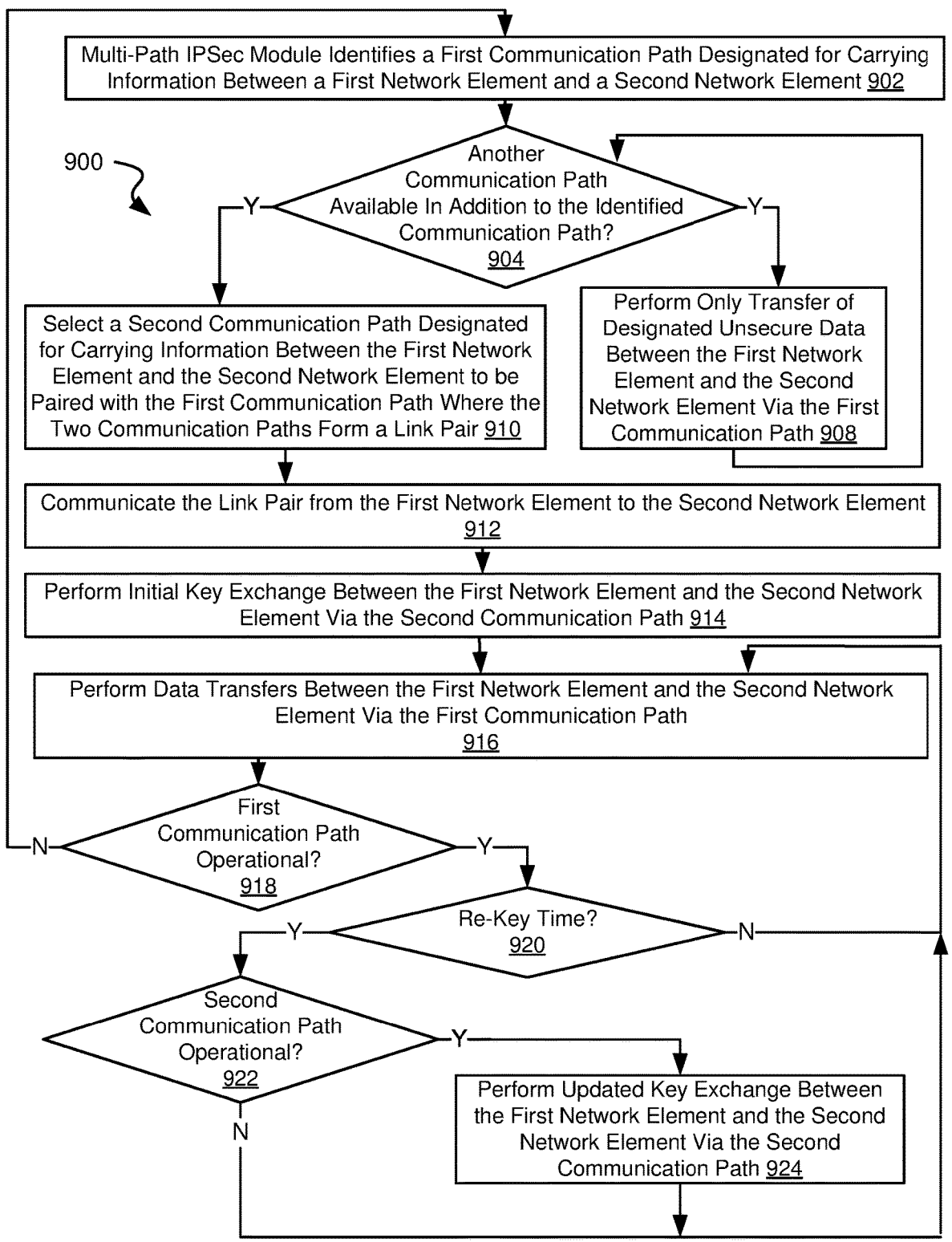

Turning to FIG. 9, a flow diagram 900 shows a method in accordance with some embodiments for providing multi-path security using standard SD-WAN communication path maintenance. The method discussed in relation to flow diagram 900 relies upon SD-WAN functionality to maintain one or more communication paths between a first network element and a second network element. In a standard IPSec implementation, one or more of the communication paths maintained by the SD-WAN functionality may be designated for secure communications. In such a standard IPSec implementation both key exchange and data exchange are performed over the same communication path. As described above, such an approach may not be suitable in the future.

In the embodiment discussed in relation to FIG. 9, a multi-path IPSec module in accordance with some embodiments automatically identifies a communication path maintained by the SD-WAN functionality to be used for key transfer in relation to another communication path maintained by the SD-WAN functionality. Thus, data will be transferred on one communication path maintained by the SD-WAN functionality, and the key exchange will be performed on another communication path maintained by the SD-WAN functionality. Key exchange may be performed on the same communication path that is used to transfer data unrelated to the key. Thus, using a two communication path example, the SD-WAN functionality may designate a first communication path to handle transfer of a first data type (e.g., voice over IP (VOIP) data), and a second communication path to handle transfer of a second data type (e.g., large file transfers). Key exchange to facilitate decryption of the first data type would be performed over the second communication path (i.e., a communication path different from that where the first data type is transferred), and key exchange to facilitate decryption of the second data type would be performed over the first communication path (i.e., a communication path different from that where the second data type is transferred). When a communication path fails, the SD-WAN functionality moves the data previously being transferred on the failed communication path to another communication path. When this happens, multi-path IPSec module identifies, where necessary and/or if possible, a new communication path to perform any key transfer that was being performed on the failed communication path. Based upon the disclosure provided herein, one of ordinary skill in the art will recognize a variety of SD-WAN functionality with which a multi-path IPSec module may interact to provide multi-path security in accordance with different embodiments.

Following flow diagram 900, the multi-path IPSec module identifies a first communication path designated for carrying information between a first network element and a second network element 902. This first communication path has been designated by the SD-WAN functionality for transfer of a particular data type, and the multi-path IPSec module will attempt to find another communication path (i.e., a communication path other than the identified first communication path) that can be used to perform key exchange to facilitate decryption of the first data type. To this end, the multi-path IPSec module determines whether another communication path (another communication path in addition to the identified first communication path) is maintained by the SD-WAN functionality exists (block 904). The other communication path may be any communication path including those designated for transferring data unrelated to that data designated to transfer via the first communication path and/or key exchange for other communication paths. Where no additional communication path is available (block 904), a message is provided to the SD-WAN functionality indicating that only data which does not require a quantum-safe level of encryption may be transferred via the first communication path (block 908). In turn, the SD-WAN functionality (or a novel front end to the SD-WAN functionality) may operate to assure that sensitive data that should be encrypted is not allowed to be transferred until another communication path is established by the SD-WAN functionality.

Alternatively, where an additional communication path is available (block 904), one of the additional communication paths is selected as a second communication path between the first network element and the second network element, and paired with the first communication path as a link pair (block 910). The link pair is communicated from the first network element to the second network element with an indication that the second communication path of the link pair will be used for key exchange to facilitate decryption data transferred via the first communication path (block 912).

An initial key exchange is performed via the second communication path between the first network element and the second network element (block 914). This key exchange may be performed, for example, similar to a standard IPSec protocol with the only difference being that the key exchange is performed on a communication path that is different from the communication path over which data will be transferred. Based upon the disclosure provided herein, one of ordinary skill in the art will appreciate various processes for performing key exchange that may be used in relation to different embodiments. With the key exchange complete (block 914), transfer of decrypted data over the first communication link between the first network element and the second network element proceeds (block 916). Any process known in the art for sending encrypted data between a first network element and a second network element may be used.

The operational status of both the first communication path and the second communication path is continually monitored. This operational stats information is made available to the multi-path IPSec module which determines whether the first communication path is operational (block 918). Where it is determined that the first communication path is not operational (block 918), the SD-WAN functionality will have potentially re-assigned the data to be transferred via the first communication path to another available communication path. This may result in, for example, re-assignment of the data transfer to the second communication path (i.e., the communication path over which the key exchange proceeds). Because of this, anytime a link becomes non-operational, the multi-path IPSec module re-performs the processes of blocks 902-918 to assure that any key exchanges which were using this path continue to do so over a communication path that is different from the communication path over which the encrypted data is sent.

Alternatively, where it is found that the first communication path is still operational (block 918), it is determined whether it is time to perform a re-key process where updated keys are exchanged between the first network element and the second network element (block 920). Such re-keying is done to enhance security by assuring that any key is only valid for a limited time period. As an example, re-keying may be done once every hour. Based upon the disclosure provided herein, one of ordinary skill in the art will recognize a variety of time periods that may be used in relation to different embodiments. Where it is not yet time to re-key (block 920), data transfers continue over the first communication path (block 916) and the operational status of the first communication path continues to be monitored (block 918).

Alternatively, where it is time to perform a re-key (block 920), it is determined whether the second communication path (i.e., the communication path over which key exchange is performed for the data transferring over the first communication path) is operational (block 922). As discussed above, the operational status of both the first communication path and the second communication path are continuously monitored. Where the second communication path is operational (block 922), key exchange is performed between the first network element and the second network element over the second communication link (block 924). Such re-keying uses the same process as the initial key exchange (block 914) and results in a change to the key that is used to decrypt data transferred between the first network element and the second network element over the first communication link. Alternatively, where it is found that the second communication path is not operational (block 922), no re-keying is performed. Rather data transfer continues between the first network element and the second network element over the first communication link using the pre-existing key. Such an approach has somewhat reduced security as a key will continue to be used longer that the preset re-key time, but the insecurity is limited as the possibility of having the pre-existing key is unlikely due to performance of the key exchange over a communication link separate from the communication link used to transfer the data.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for performing multi-path secure data transfers in a software-defined wide area network a (SD-WAN) environment, the method comprising:
    identifying, by a processing resource, a first communication path maintained in the SD-WAN environment to be used for transferring key information and a second communication path maintained in the SD-WAN environment to be used for transferring encrypted data, and wherein the encrypted data is decryptable using the key information;
    receiving, by the processing resource, a request to transfer a first data set to a recipient;
    performing, by the processing resource, a first key exchange via the first communication path;
    transferring, by the processing resource, a first encrypted data set corresponding to the first data set to the recipient via the second communication path;
    designating, by the processing resource, the first communication path for transferring second encrypted data in addition to first key information;
    designating, by the processing resource, the second communication path for transferring second key information in addition to first encrypted data, wherein the second encrypted data is decryptable using the second key information;
    receiving, by the processing resource, a request to transfer a second data set to the recipient;
    performing, by the processing resource, a second key exchange via the second communication path, wherein the second key exchange involves the second key information; and
    transferring, by the processing resource, a second encrypted data set corresponding to the second data set to the recipient via the first communication path.

2. The method of claim 1, wherein the first communication path and the second communication path are distinct from one another at least from the processing resource to a network gateway associated with the recipient.

3. The method of claim 1, wherein the first communication path and the second communication path do not have any common infrastructure at least from the processing resource to a network gateway associated with the recipient.

4. The method of claim 1, wherein the first communication path is provided by a first commercial entity, and the second communication path is provided by a second commercial entity.

5. The method of claim 1, wherein the method further comprises:
    determining, by the processing resource, that the first communication path is inoperable;
    identifying, by the processing resource, a third communication path maintained in the SD-WAN environment to be used for transferring key information for the encrypted data transferred via the second communication path.

6. The method of claim 1, wherein the method further comprises:
    determining, by the processing resource, that the first communication path is inoperable; and
    designating, by the processing resource, the first communication path for both transferring key information for transferring encrypted data.

7. The method of claim 6, wherein the method further comprises:
    precluding, by the processing resource, transfer of the encrypted data via the first communication path where the encrypted data is not identified as quantum safe.

8. A system for performing multi-path secure data transfers in a software-defined wide area network (SD-WAN) environment, the system comprising:
    a processing resource;
    a non-transient computer readable medium coupled to the processing resource and having stored therein instructions that when executed by the processing resource cause the processing resource to:
  identify a first communication path for transferring key information and a second communication path for transferring encrypted data, and wherein the encrypted data is decryptable using the key information;
  receive a request to transfer a first data set to a recipient;
  perform a first key exchange via the first communication path;
  transfer a first encrypted data set corresponding to the first data set to the recipient via the second communication path;
  designate the first communication path for transferring second encrypted data in addition to first key information;
  designate the second communication path for transferring second key information in addition to first encrypted data, wherein the second encrypted data is decryptable using the second key information;
  receive a request to transfer a second data set to the recipient;
  perform a second key exchange via the second communication path, wherein the second key exchange involves the second key information; and
  transfer a second encrypted data set corresponding to the second data set to the recipient via the first communication path.

9. The system of claim 8, wherein the first communication path and the second communication path are distinct from one another at least from the processing resource to a network gateway associated with the recipient.

10. The system of claim 8, wherein the first communication path and the second communication path do not have any common infrastructure at least from the processing resource to a network gateway associated with the recipient.

11. The system of claim 8, wherein the first communication path is provided by a first commercial entity, and the second communication path is provided by a second commercial entity.

12. The system of claim 8, wherein the non-transient computer readable medium further has stored therein instructions that when executed by the processing resource cause the processing resource to:
  determine that the first communication path is inoperable;
  identify a third communication path to be used for transferring key information for the encrypted data transferred via the second communication path.

13. The system of claim 8, wherein the non-transient computer readable medium further has stored therein instructions that when executed by the processing resource cause the processing resource to:
  determine that the first communication path is inoperable; and
  designate the first communication path for both transferring key information for transferring encrypted data.

14. The system of claim 13, wherein the non-transient computer readable medium further has stored therein instructions that when executed by the processing resource cause the processing resource to:
  preclude transfer of the encrypted data via the first communication path where the encrypted data is not identified as quantum safe.

15. A non-transient computer readable medium having stored therein instructions that when executed by the processing resource cause the processing resource to:
  identify a first communication path in a software-defined wide area network (SD-WAN) environment for transferring key information and a second communication path in the SD-WAN environment for transferring encrypted data, and wherein the encrypted data is decryptable using the key information;
  receive a request to transfer a first data set to a recipient;
  perform a first key exchange via the first communication path;
  transfer a first encrypted data set corresponding to the first data set to the recipient via the second communication path;
  designate the first communication path for transferring second encrypted data in addition to first key information;
  designate the second communication path for transferring second key information in addition to first encrypted data, wherein the second encrypted data is decryptable using the second key information;
  receive a request to transfer a second data set to the recipient;
  perform a second key exchange via the second communication path, wherein the second key exchange involves the second key information; and
  transfer a second encrypted data set corresponding to the second data set to the recipient via the first communication path.

16. The non-transient computer readable medium of claim 15, wherein the first communication path and the second communication path are distinct from one another at least from the processing resource to a network gateway associated with the recipient.

17. The non-transient computer readable medium of claim 15, wherein the first communication path and the second communication path do not have any common infrastructure at least from the processing resource to a network gateway associated with the recipient.

18. The non-transient computer readable medium of claim 15, wherein the first communication path is provided by a first commercial entity, and the second communication path is provided by a second commercial entity.

19. The non-transient computer readable medium of claim 15, wherein the non-transient computer readable medium further has stored therein instructions that when executed by the processing resource cause the processing resource to:
  determine that the first communication path is inoperable;
  identify a third communication path to be used for transferring key information for the encrypted data transferred via the second communication path.

20. The non-transient computer readable medium of claim 15, wherein the non-transient computer readable medium further has stored therein instructions that when executed by the processing resource cause the processing resource to:
  determine that the first communication path is inoperable; and
  designate the first communication path for both transferring key information for transferring encrypted data.

\* \* \* \* \*